United States Patent [19]
Pearson

[11] 4,370,442
[45] Jan. 25, 1983

[54] FIRE RETARDANT COMPOSITIONS

[76] Inventor: Glenn A. Pearson, 3709 S. George Mason Dr., Falls Church, Va. 22041

[21] Appl. No.: 214,017

[22] Filed: Dec. 5, 1980

[51] Int. Cl.³ .............................................. C08L 61/20
[52] U.S. Cl. .................................... 524/598; 106/18.15
[58] Field of Search .................. 260/29.4 R; 528/256, 528/262, 242–244; 524/598, 843; 106/18.15

[56] References Cited

U.S. PATENT DOCUMENTS

| | | | |
|---|---|---|---|
| 2,452,054 | 10/1948 | Jones et al. | 260/29.4 R |
| 2,564,925 | 8/1951 | Pollard | 260/29.4 R |
| 2,582,961 | 1/1952 | Burnell et al. | 260/29.4 R |
| 2,832,745 | 4/1958 | Hechenbleikner | 260/29.4 R |
| 3,458,464 | 7/1969 | Shriver et al. | 260/29.4 R |
| 3,488,310 | 1/1970 | McCombs | 260/29.4 R |
| 3,939,107 | 2/1976 | Brown | 260/29.4 R |
| 3,983,269 | 9/1976 | Pearson | 260/29.4 R |
| 4,119,598 | 10/1978 | Pearson . | |
| 4,215,172 | 7/1980 | Pearson . | |
| 4,284,759 | 8/1981 | Henbest | 524/598 |

*Primary Examiner*—Norman Morgenstern
*Assistant Examiner*—Janyce A. Bell
*Attorney, Agent, or Firm*—Lowe, King, Price & Becker

[57] ABSTRACT

A method of preparing an aqueous resinous system, and the resinous system produced by the method is described wherein about 75–100 parts of an aldehyde such as formaldehyde, about 100–125 parts of phosphoric acid, about 15–25 parts of an alkanolamine such as triethanolamine, about 30–50 parts of urea, and about 20–40 parts of melamine, based on 100–200 parts of water, are reacted to provide an aqueous resinous solution which will cure at room temperature or upon application of heat, permitting its use as a flexible, pliable, waterproof, nonburning coating, especially for textiles and paper containing materials. The solution may be applied by impregnation or as a coating to the fabric or an underlayer to the fabric. In a special embodiment, there is provided a method for providing fire retardancy to a textile fabric applied over an underlayer such as muslin, by applying a fire retardant solution to the underlayer. There is also provided a fire retardant spray solution.

13 Claims, No Drawings

FIRE RETARDANT COMPOSITIONS

FIELD OF THE INVENTION

The present invention relates to resinous coating systems. More particularly, it relates to novel urea-formaldehyde resinous systems whereby aqueous formaldehyde, urea, and optionally an alkanolamine, melamine, and phosphoric acid are sequentially reacted in selected proportions to yield an aqueous resinous composition providing unique properties and/or characteristics when employed as or in coatings, particularly coatings which are flexible, waterproof and fireproof, especially for use on textiles.

BACKGROUND ART

Urea-formaldehyde resinous systems are well known in the art for use in various applications. Moreover, various modifications to such resinous systems have been described in the literature including the co-reaction of the formaldehyde and urea with triethanolamine. Further, techniques have been devised to provide formaldehyde-urea resinous systems which are water soluble. However, in the prior art systems, the control of the reaction is difficult, apparently due to the high reactivity of the formaldehyde and urea leading to varying degrees of nonuniformity of the resinous system from batch to batch. To obtain water soluble resinous systems, relatively complex techniques of acidification and neutralization are necessary. These techniques again lead to non-uniform resinous systems which often provide cured products with deficiencies.

Systems of this type are described in my prior U.S. Pat. Nos. 3,883,462; 3,983,269; 3,984,367; 3,990,977; 4,119,598 and 4,215,172. All of these prior patents describe urea-formaldehyde compositions similar to those claimed herein. The compositions and methods of the present invention are improvements over my prior patents, especially U.S. Pat. Nos. 4,119,598 and 4,215,172, in the formation of a resinous coating solution having excellent fire retardant properties and flexibility.

SUMMARY OF THE INVENTION

It is accordingly a primary object of the present invention to provide a method of producing a water-soluble urea-formaldehyde resin system and the resulting resinous systems which have consistent uniformity from batch to batch.

It is another object of this invention to provide an aqueous resinous system which is compatible with various additives, permitting modification of the system to meet the requirements of various diverse applications.

It is a further object of this invention to provide an aqueous resinous system which is air or heat curable to a tough, clear, flexible, waterproof nonburning and nonstaining coating.

These and other objects of the present invention will be more readily apparent from the following detailed description.

In satisfaction of the foregoing objects and advantages there are provided by this invention an aqueous resinous composition comprising the following components:

| Component | Amount |
| --- | --- |
| Aldehyde | 75–100 parts |
| Urea | 30–50 parts |
| Melamine | 20–40 parts |
| Alkanolamine | 15–25 parts |
| Phosphoric Acid | 100–125 parts | the amounts of these components being present per 100 parts of water.

The aqueous solution of the invention is especially suitable as a flexible, nonstaining, fire retardant coating, especially for textiles.

PREFERRED EMBODIMENTS

The aforesaid objects of the present invention are accomplished by the sequential reaction of an aldehyde such as formaldehyde, urea, phosphoric acid, and an alkanolamine such as triethanolamine in selected proportions. If triethanolamine is added, it is mixed with the formaldehyde prior to addition of the urea. The proportions are based on use of 100 to 200 parts of water and are as follows:

| Component | Amount | Preferred Amount |
| --- | --- | --- |
| Aldehyde | 75–100 wt % | 90 parts |
| Urea | 30–50 wt % | 40 parts |
| Melamine | 20–40 wt % | 30 parts |
| Alkanolamine | 15–25 wt % | 20 parts |
| Phosphoric Acid | 100–125 wt % | 115 parts |

The ratios should not deviate from the aforesaid stated amounts by more than about 15 percent because the unique properties of the polymer will be affected and to this extent, the ratios are critical. The sequential addition of the reactants should also be followed. In the preferred sequence, the aldehyde and urea are initially mixed together with the alkanolamine and the melamine in aqueous solution, and the phosphoric acid is added last.

While urea is the preferred reactant, it should be understood that other ureas such as thiourea, ethylene urea, dimethylol ethylene urea, dimethylol propylene urea, dimethylol dihydroxy ethylene urea, or other substituted urea may be employed. As the aldehyde, one may use a simple aldehyde such as formaldehyde, acetaldehyde, paraldehyde, glyoxal, or other mono-, di, or poly-aldehydes. In addition, any substance yielding or acting as an aldehyde may be used. Formaldehyde is the preferred aldehyde as it is conveniently obtained commercially as a 37 weight percent aqueous solution. If the 37 wt % formaldehyde solution is used, about 230–250 parts of the solution should be employed per 100 parts of water. The preferred alkanolamine may have 1 to 4 carbon atoms in the alkyl group, and the most preferred alkanolamine is triethanolamine, but others such as diethanolamine or mixtures may also be used. Triethanolamine is commercially available as a 98% solution. The phosphoric acid is preferably employed as an 85% solution.

A feature of the present invention which represents an improvement over my prior patents mentioned above is the incorporation of melamine into the solution. It has been discovered that addition of melamine to the solution, in combination with the other components, provides advantageous properties over the compositions described in my prior patents. In particular, the resulting composition permits formation of an aqueous one-part clear solution which is easy to use, is dilutable with hot or cold water, and is stable over long periods of storage. Further, when applied as a coating to textiles, paper boards and the like, dried and cured, the resulting coating or impregnant is clear, flexible, non-staining, more resistant to moisture and does not turn white. The composition also provides an excellent fire retardant film on the substrate which will not burn and even resists smoldering, even on textiles such as cottons.

The melamine is preferably added as a powder to an aqueous solution of the aldehyde, urea, and akanolamine. The melamine is preferably added as the commercially available material Cymel, a trademarked product of American Cyanamide. Thereafter, the phosphoric acid is added and a clear solution obtained after an initial exothermic reaction. The resulting solution may be diluted as desired for use in different applications.

It is also within the scope of the invention to employ other additives to the compositions to affect other properties. Thus metal and ammonium salts can be added to increase the efficiency of the fire retardant characteristics and other desirable properties such as hardness and greater resistance to solvents or weathering. Additives of this type include oxides, hydroxides, sulfates, nitrates, phosphates, and chlorides of aluminum, zinc, tin, antimony, as well as ammonium salts. The metal salts are mixed with the phosphoric acid in the formulation whereas ammonium hydroxide when used is mixed with the urea-formaldehyde solution. The metal salts are reacted in an amount of about 6 to 12 moles based on the moles of phosphoric acid used. Ammonium hydroxide is used in an amount of about 15 to 20 moles based on the moles of aldehyde used. The ammonium hydroxide is used as a buffer to raise the pH of the solution. In a still further embodiment, lactic acid or equivalent may be added to the solution in an amount of about 0.1 to 20 parts per 100 parts of total solution as this material improves stability, prevents cloudiness and cracking of the coating.

Although the aqueous resinous system of this invention can be used as such in or as coatings, moldings, adhesives, or the like, a characteristic feature of the resinous system is its compatibility with various accelerators and modifiers to permit the use of the resinous system in diverse applications. More specifically, the resinous system is compatible with other catalyzing agents, other fireproofing agents, fillers, pigments, lubricants, and the like.

The resin is formed by mixing the ingredients in the amounts and in the sequence indicated above. Mixing is preferably carried out at room temperature but when the phosphoric acid is added an exothermic reaction occurs and the temperature rises rapidly to 120°–150° F. (49°–66° C.). On cooling, the resulting resinous product is ready for use.

The solution is cured on the fabric or other substrate by exposure to air at room temperature for about 10 minutes or by heating at temperatures of about 120° to 140° C. (248°–284° F.) for periods of about 1 to 5 minutes.

As indicated, when applied as a coating, the resin dries and cures at room temperature to provide a coating that is flexible, pliable, waterproof, and will not burn. It is thus useful as a coating on substrates such as textiles of all types, paper, cardboard, panel boards, wall board, sheet rock, television backboards, fibre boards, table tops, rigid or soft foam, wood, metals such as aluminum, and the like. The coatings may be used to prevent the oxidation of metals, i.e., as a rust-proofing agent, as a fire- and waterproof coating on wood, cardboard and fiberglass packing and the like. The coatings are especially beneficial for fabrics because a clear non-staining, fire retardant, flexible film is applied to the fabric. The fabrics which may be treated include 100% cotton and cotton blends, as with polyesters.

While the triethanolamine is not essential to the composition of the invention, it is advantageous as it provides for thicker coatings when desired, a coating which is easier to laminate, and the resin does not congeal or form a film in water as readily, when those properties are desired.

The aqueous resinous solution of the invention may be applied as a coating or by impregnation. It is especially useful for application to textiles to render them fire retardant. It is preferable to apply the solution in a diluted form when applied by impregnation.

When applied as a coating it is preferable to apply the coating to the underside of the textile or fabric so as to preserve the hand and feel of the fabric. It is also preferred to add about 20–30 parts, preferably about 25 parts, of a filler to the solution to provide body. Suitable fillers include flours, starches, calcium sulfate or the like. The preferred filler is pecan shell flour.

The coating is applied as by spraying and then dried. It is then cured, either at room temperature or by heating to about 120° to 140° C. (248°–284° F.). Curing at an elevated temperature is helpful in the removal of odors from the fabric. The coating should be applied at the rate of about 1.5 oz. per sq. yd. The resulting coated fabric or textile has good fire retardancy characteristics, even when subjected to standard cigarette burn tests.

When applied by impregnation, it is preferred to dilute the solution in order to retain the hand, tensile, and color of the fabric. Thus the formulation is diluted to about 15 to 25 wt % for best results. In addition, it is preferred to add a fabric softener, such as that sold under the tradename "Downey," in the impregnation procedure.

In the preferred impregnation procedure, each 100 grams of the textile should be treated with a substantially equal amount of treating solution. The formulation used in the impregnation procedure preferably contains about 10 to 25 wt % of the above formulation. In a most preferred aspect, each 100 grams of impregnating solution would contain about 12 to 20 grams of the above formulation, preferably about 15 grams, together with about 1.5 grams of a fabric softener, and the balance water containing about 15 to 30 wt % of a lower alkyl alcohol, preferably about 25 wt % of ethanol.

The solution and textile are placed in a plastic bag to wet the sample to the drip point. It is then dried and cured as described. The resulting treated product has good fire retardancy and will also pass the cigarette burn test without afterburn or afterglow.

It is a feature of the invention that the basic formulation, preferably in dilute form may be applied as a spray solution using conventional spray apparatus. When used as a spray solution, each 100 grams of the spray solution would contain about 12 to 20 grams, preferably about 15 grams of the above formulation, optionally with about 1.5 grams of a commercial softener, and the remainder a water/lower alkyl alcohol mixture, preferably a water solution containing about 15–30 wt % alcohol. There may also be added about 5% of a commercial water repellant such as DuPonts Zepel. This provides a solution which provides fire retardancy and also gives stain resistance and water repellancy to the textile or fabric.

This spray solution may be applied using any conventional spray system including aerosols. Use as a spray solution is simply to spray the solution on the fabric and allow to dry. It will then cure at room temperature to provide a flexible fire retardant coating. The spray solution thus provides a procedure by which the resinous solution of the invention may be applied to finished pieces of upholstered furniture, draperies and the like.

A further feature of the invention is a method for providing fire retardancy characteristics to textiles or fabrics by applying a fire retarding solution, such as that disclosed herein, to an underlayer fabric. It has been unexpectedly discovered that treatment of the underlayer so as to make it fire retardant, will prevent the outer decorative fabric layer from burning. Examples of such structures are upholstered furniture where an underlayer of muslin is covered with a decorative fabric and on mattress tickings. It has been found that impregnation of the muslin or mattress ticking will prevent burning of the overlayers in the final structure.

In this method, any fire retardant solution may be employed. However, it is preferred to impregnate the underlayer with about 20 to 35 wt %, preferably about 25 wt % of the treating solution of this invention, drying and curing as described above.

PREFERRED EMBODIMENT AND ILLUSTRATIVE EXAMPLES

Having described the invention in general terms, a preferred and illustrative embodiment of the invention, as well as examples of the utility of the invention, will be set forth. In these examples and throughout the specification, parts are by weight unless otherwise indicated.

EXAMPLE 1

Two hundred-forty-three grams of aqueous formaldehyde (37 percent nonvolatile), 20 grams 98% triethanolamine and 40 grams of 100% urea are well mixed and dissolved in 100 grams of water. There is then added 30 grams of melamine followed by 115 grams of aqueous phosphoric acid (85 percent nonvolatile). An exothermic and substantially immediate reaction occurs. The resulting solution is clear on cooling.

To show the utility of the resinous composition, the cool solution obtained is applied to (a) a swatch of light colored fabric and (b) a piece of cardboard as thin coatings with a paint brush. The fabric and cardboard are dried and cured at room temperature for ten minutes. The coatings on the fabric and cardboard are uniform, without indication of blistering or the like, and are completely clear, only emphasizing the natural texture of the substrates. On bending of the fabric and treated cardboard, the coating are observed to be flexible and do not crack. The fabric and cardboard are placed in a water bath maintained at room temperature for a period of eight hours with only portions submerged. Thereafter, they are withdrawn from the water bath and permitted to dry. After drying, there is no visible effect of the water upon the resin coatings. The submerged and unsubmerged portions are identical.

EXAMPLE 2

A formulation prepared according to Example 1 was tested for flame retardancy using the following test procedure.

A mini mock up system is used in the laboratory to simulate an upholstered chair. The device consisted of a board 8"×8" for the back and the same for the seat. Two pieces of polyurethane foam, 8"×8"×2" are used for the back, and 8"×6"×2" for the seat. These pieces of foam are covered with upholstery fabric, taped around the foam so as to be held tightly in place. The fabric was impregnated according to the procedure of the invention. The foam is placed in vertical and horizontal positions respectively, as the back and seat. A lighted cigarette is placed in the crack where the seat and back come together. A 4×4 inch piece of light sheeting fabric is placed over the lighted cigarette. The cigarette is allowed to burn or smolder until it has burned itself out. According to accepted burn standards, a char width of 3 inches is allowed on each side of the burned cigarette. If the fabric or foam continues to smolder after one hours time has elapsed, then the test has failed as it will also have extended over the allowed 3 inches char area.

The composition of the example caused the cigarette to go out in less than one hours time leaving a char area of less than 3 inches and thus passes the test.

EXAMPLE 3

A solution prepared according to Example 1 was subjected to the following test for fire retardancy.

The aqueous solution was coated onto samples of luan plywood using approximately 20 grams per square foot, then dried using a hand type hair dryer. Samples were tested for flame spread which were more than adequate, and equal to a class "A" rating. A wet paper towel was placed on a duplicate sample and left for 18 hours. Upon removal of the paper towel the sample showed no discernible change in the finish, and no whiteness occurred.

EXAMPLE 4

The following tests illustrate use of the aqueous solution of Example 1 as an adhesive.

(A) In the first test, a sample board composed of sawdust was sprayed with the solution using 20% by weight of the solution to weight of the sawdust, mixed well and left to dry. After drying, the mixtures were placed in a mold consisting of two heavy aluminum plates. Heat and pressure were applied approximately at 300° F. (149° C.). After cooling a one inch thick board was removed. There was no residual odor of formaldehyde. When tested for burning excellent results were obtained. A portion of the sample was soaked in water for 72 hours with no signs of swelling or disintegration.

(B) In the second test, a plywood sample was made by placing a ¼ inch pine core into a bath of solution and left for about one hour. A before and after weight showed 12% wet pick-up. The core material was dried and placed between two 1/28 inch pine veneers. The heat and pressure liquified the polymer solution and forced it into the fibers of the veneer, flame retarding the same. The heat causes it to become a thermoset plastic that is highly insoluble, and makes an excellent bond. Heat and pressure were applied. A portion of the sample was soaked in hot and cold water for several days, showing no signs of swelling or loosening of the bond. On testing for burning the board showed a very low flame spread rating.

EXAMPLE 5

In this example, 15 grams of the formulation of Example 1 is dissolved into 83.5 grams of a 25% solution of ethanol in water and 1.5 grams of "Downey" fabric softener is added. This solution and a 100 gram sample of cotton velvet are placed in a plastic bag and mixed until the fabric picks up as much solution as possible and reaches the drip point. The fabric is then removed from the plastic bag, dried and cured by heating at 125° C. for 2 minutes. The treated sample passes the cigarette burn test.

EXAMPLE 6

To a formulation of Example 1 is added 25 wt % of pecan shell flour as a filler and the resulting solution is coated on the backside of a 100% cotton fabric. The coated fabric is dried at room temperature and cured by heating at 125° C. for 2 minutes. The coating weight was at the rate of 1.5 oz./sq.yd. The treated fabric passed the cigarette burn test even though only the backside of the fabric was treated.

EXAMPLE 7

A muslin fabric impregnated with the solution according to the procedure of Example 5 is placed on a board, stretched, and taped so as to be drawn tight. An untreated decorative fabric is then drawn tightly over the muslin. The decorative fabric was then subjected to the cigarette burn test and is found to pass this test even though only the underlayer is treated with the fire retardant solution.

EXAMPLE 8

To a solution of the components and amounts described in Example 5 is added 5 wt % of a water repellent sold commercially as Zepel by DuPont. The resulting solution is then placed in a spray container and sprayed on a swatch of fabric. The sprayed fabric is then allowed to dry and cure at room temperature. The treated fabric does not burn and also repels water.

The invention has been described herein with reference to certain preferred embodiments. However, as obvious variations thereon will become apparent to those skilled in the art, the invention is not considered to be limited thereto.

What is claimed is:

1. A resinous aqueous solution comprising the reaction product in about 100-200 parts of water of (a) about 75-100 parts of aldehyde, (b) about 30-50 parts of urea, (c) about 20-40 parts of melamine and (d) about 100-125 parts of phosphoric acid, the solution being a stable clear solution having a good shelf life and forming flexible, waterproof and nonburning films on substrates.

2. A solution according to claim 1 wherein 15-25 parts of an alkanolamine is also mixed with the formaldehyde prior to addition of the other reactants.

3. A solution according to claim 1 wherein the aldehyde is a 37% aqueous solution of formaldehyde.

4. A solution according to claim 1 wherein the phosphoric acid is 85% aqueous phosphoric acid.

5. A solution according to claim 1 wherein the reaction product comprises the reaction of about 243 parts of a 37% solution of formaldehyde, about 40 parts of urea, about 30 parts melamine, and about 115 parts of 85% phosphoric acid.

6. A solution according to claim 5 which includes about 20 parts of 98% triethanolamine.

7. A solution according to claim 1 wherein a metal salt selected from the group consisting of the oxides, hydroxides, sulfates, nitrates, phosphates, and chlorides of aluminum, zinc, tin and antimony, is added to the phosphoric acid prior to mixing with the formaldehyde and urea.

8. A solution according to claim 1 wherein ammonium hydroxide is added to the urea and formaldehyde solution prior to mixing with the phosphoric acid.

9. A solution according to claim 1 wherein lactic acid is added to the final solution.

10. A resinous solution according to claim 1 also containing about 20-30 parts of a filler and suitable for coating on a substrate.

11. A resinous solution according to claim 1 which has been diluted to a 15 to 25 parts concentration with an alcohol/water solution.

12. A resinous solution according to claim 11 also containing about 1.5 parts of a fabric softener.

13. A spray solution according to claim 11 also containing a water repellant.

* * * * *